May 29, 1962     D. C. LIPS     3,036,592
VALVE ASSEMBLY
Filed Feb. 16, 1959
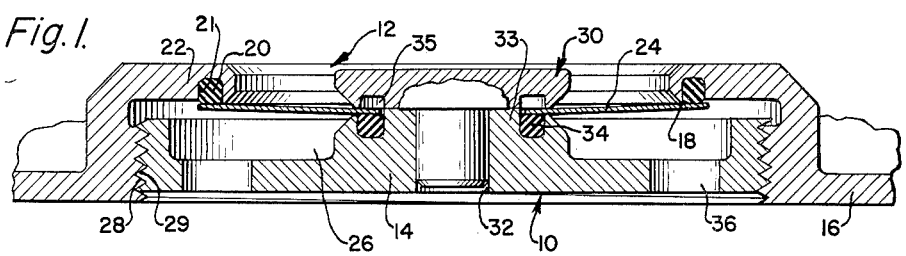
Fig. 1.
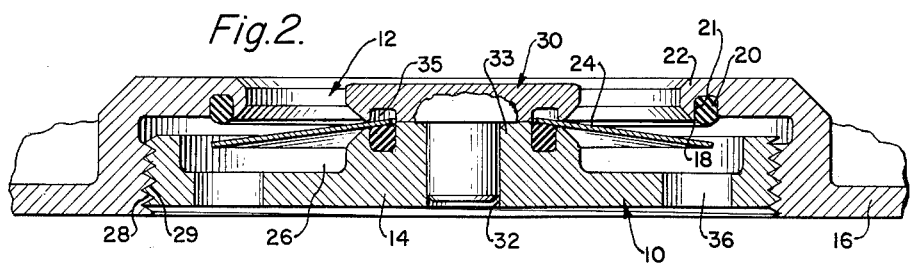
Fig. 2.
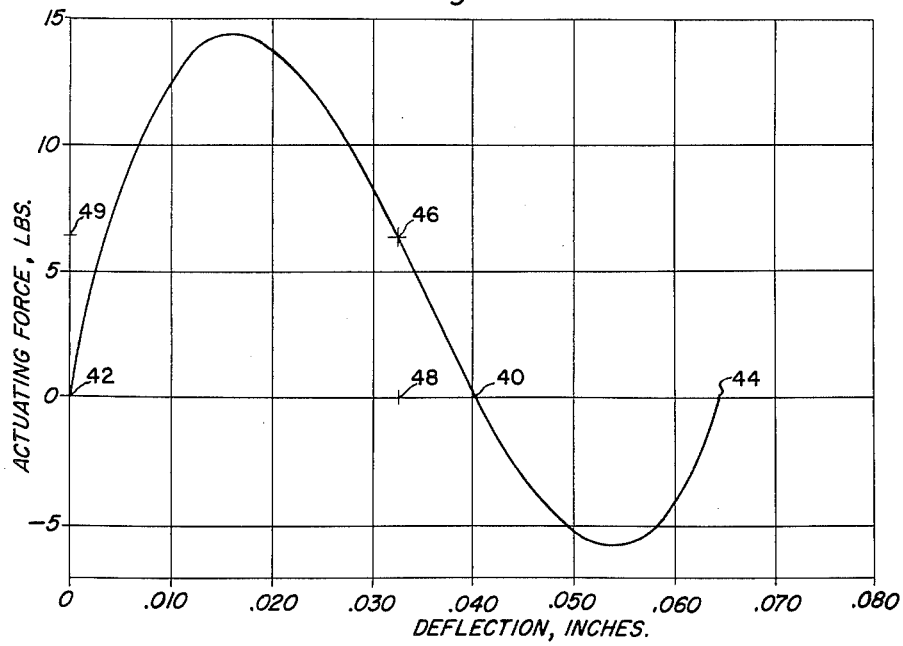
Fig. 4.
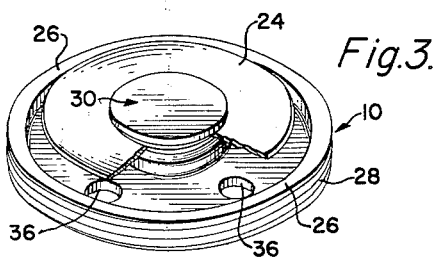
Fig. 3.
INVENTOR:
DONALD C. LIPS,
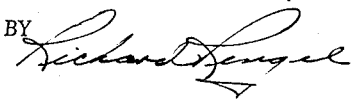
Attorney.

United States Patent Office 3,036,592
Patented May 29, 1962

1

3,036,592
VALVE ASSEMBLY
Donald C. Lips, Torrance, Calif., assignor to The Garrett Corporation, Los Angeles, Calif., a corporation of California
Filed Feb. 16, 1959, Ser. No. 793,341
7 Claims. (Cl. 137—467)

The present invention relates to valve assemblies and more particularly to pressure relief valve assemblies for use in connection with sealed enclosures.

Often, the fluid pressure in a sealed enclosure is regulated by a suitable pressure regulating device controlling the flow of fluid into the enclosure from a suitable pressure supply line. In many instances, the line pressure greatly exceeds the regulated pressure in the enclosure and any increase in pressure in the enclosure beyond a given range of pressures cannot be tolerated without substantial damage to the structure of the enclosure or equipment housed therein. In order to protect the enclosure and any equipment therein from damage due to excessive pressures which may result, for example, upon breakdown of the regulator, the pressure relief valve of the present invention provides for the escape of fluid from the enclosure.

Adequate protection against excessive fluid pressures from relatively high pressure supply lines is provided by the relief valve of the present invention which has an instantaneous response to the increased pressures followed by adequate discharge or venting of fluid from the enclosure. In response to increased pressures the valve is operated from a normally closed position directly to a fully opened position, providing maximum fluid flow through the valve opening. A basic requirement, of course, is that such a valve assembly be extremely simple and compact, particularly if it is to be mounted in the wall of an enclosure.

It is an object therefore of the present invention to provide a pressure relief valve assembly having the foregoing features and advantages.

Another object of the present invention is the provision of a valve which is operable from a closed position directly to an opened position to provide maximum pressure relief instantaneously.

A further object is to provvide a valve which is stable in both its opened and closed positions.

Still another object of the invention is the provision of a valve which is adjustable in operation over a wide range of fluid pressures.

Another object is to provide a valve which is simple in construction, dependable, and adapted for mounting in the wall of an enclosure.

A further object of the invention is the provision of a pressure relief valve for an enclosure which protects equipment in the enclosure from excessive fluid pressures resulting from the failure of a pressure regulator or other device controlling the flow of fluid from a pressure supply line to the enclosure.

A still further object of the invention is to provide a valve assembly including an annular valve port member providing a valve seat and an opening for the passage of fluid and a valve disposed in said opening for ccontrolling the passage of fluid through the opening including a spring metal disc which is formed slightly dished and which has a central opening. The valve disc is supported by a body member which is adjustably secured to the valve port member, urging the annular outer edge portion of the disc into engagement with the valve seat. The valve disc is retained by the body support member engaging the disc about its central opening to provide a fluid tight seal while permitting relative movement of the disc during deflection.

Still another object is to provide a pressure relief valve assembly including a frusto-conical disc formed from spring metal and annular support means adjustably secured to the valve port member to maintain the disc seated in the valve seat formed therein when the valve is in a normally closed position. The disc is retained by the support means about its inner annular edge portions wherein a resilient sealing means adjacent the disc provides for the movement of the inner edge portions and seals the opening in the disc to the passage of fluids. The body member is adjustably secured to the valve port member in order to adjust the position of the disc along the line substantially normal to the valve port opening. The spring disc is formed to have a height and thickness providing for stable closed and opened positions and increasing and decreasing actuating forces with deflection of the disc to a position of zero actuating force near its center position from either a normally closed position or an opened position. Adjustment of the disc along the line normal to the valve port valve seat causes the disc to engage the valve seat deflecting the disc into the region of the actuating force and deflection characteristic curve of the disc where a decreasing actuating force is required to operate the valve to an open position. The exact operating point along the curve is predetermined by the magnitude of the actuating force produced by the fluid pressure selected for operating the valve.

Another object of the present invention is the provision of a pressure relief valve for limiting the pressure differential across the wall of an enclosure in which a sealing element is fitted in an annular channel formed in the valve seat of the valve port member. The disc is supported on a body member including a retaining pin having a head portion and a shaft portion wherein the shaft portion is passed through the disc opening and frictionally secured to a wall surrounding a central bore in the body portion to retain an inner edge portion of the disc between opposing faces of the head portion and the shoulder surrounding the bore. The faces are formed to produce annular channels providing an annular space for relative movement of the inner edge portion of the disc during the deflection of the disc in operation. An annular sealing element is seated in an annular channel to maintain a fluid tight seal about the annular inner edge of the head and the annular inner edge of the disc. The disc, being frusto-conical in shape, has a height and thickness providing stable opened and closed positions of the valve whereby a negative loading is required to reset the disc from its normally closed position. The loading and deflection characteristic curve of the spring disc has a predetermined height and thickness whereby actuating forces resulting from pressure differentials can be produced across the valve causing deflection of the disc without breaking of the fluid tight seal before operation of the valve. The deflection remains within the range of expansion of the sealing elements to retain fluid tight seals about the inner and outer edge portions of the disc while the valve remains in normally closed position. Apertures are formed in the annular body portion of the support means in order to provide access to the disc for negative actuating forces to be applied to reset the disc to its normally closed position.

Other objects and features of the invention will become apparent to those skilled in the art as the disclosure is made in the following detailed description of a preferred embodiment of the invention as illustrated in the accompanying sheet of drawing in which:

FIG. 1 is a cross-sectional view of a pressure relief valve illustrating the preferred embodiment of the invention;

FIG. 2 illustrates the valve shown in FIG. 1 in open position;

FIG. 3 is a perspective view of a removable section of the valve assembly of the preferred embodiment shown in FIGS. 1 and 2 in which a portion has been broken away; and FIG. 4 is a graph illustrating certain characteristics of a typical spring disc which is utilized in the preferred embodiment of the invention.

Referring now to the drawing wherein like reference characters designate like or corresponding parts throughout the several views, there is shown in FIGS. 1 to 3 which illustrate a preferred embodiment, a pressure relief valve assembly 10 including a valve port member 12 and a removable valve section 14 which is suitably mounted in a wall 16 of an enclosure or container to maintain a fluid tight seal when in normally closed position. The annular valve port member is formed to provide an annular valve seat 18 including a resilient sealing element 20 shown as an annular resilient ring which is fitted in an annular channel or groove 21 in the inner annular edge portion of an inwardly projecting flange 22. The valve port member has a central opening for the passage of fluid from a region of higher pressure in the interior of the enclosure above the valve assembly to a region of lower pressure below the valve assembly outside of the enclosure and on the opposite side of the wall 16.

The relief valve is operable at a desired or selected pressure differential to provide for the escape of fluids protecting the enclosure structure or equipment housed therein from excessive pressures. A frusto-conical movable valve element, which is also pressure sensitive, comprises a spring metal disc 24 formed slightly dished and with a central opening. A typical movable valve element or disc of the type referred to herein and shown in the preferred embodiment, is commonly known as a Belleville spring or washer. In the preferred arrangement, an annular support member for the spring disc which is positioned concentrically relative to the port member has a body portion 26 having threads 28 formed in its outer annular periphery whereby the removable valve section may be adjustably secured by screw threads 29 formed in the inner annular periphery of the valve port member 12.

The spring disc is supported on the body portion of the removable valve section by a retaining pin 30 having a head portion and a shaft portion. The pin is secured in a central bore 32 of the body portion, the walls of which engage the shaft of the pin to frictionally secure the pin in the bore. Shoulders 33 of the body portion, adjacent the bore, are grooved or channeled to receive a resilient sealing element or ring 34 similar to the ring 20 to maintain a fluid tight seal about the annular inner edge of the spring disc valve element. An opposing groove or channel 35 is formed in the opposing face of the head of a retaining pin 30. The space in the channels and resiliency of the sealing ring provide for relative movement of the inner annular edge portion of the spring disc during deflection while the remainder of the opposing faces of the shoulder and the head of the retaining pin maintain the disc in position. The sealing ring maintains a fluid tight seal about the inner edge portion of the disc.

Apertures 36 are formed in the body portion of the removable valve section of the valve assembly for the passage of fluid through the valve when opened and for receiving a wrench for insertion and adjustment of the removable valve section in the complementary port member. Also, the apertures provide access to the back side of the spring disc whereby a reset tool having suitably spaced prongs may be inserted in the valve assembly to engage the spring disc and apply a negative return force thereto moving the disc from an open position, illustrated in FIG. 2, to its normally closed position, shown in FIG. 1.

In operation, the preferred embodiment of a pressure relief valve assembly such as shown in FIGS. 1 to 3 of the drawing is disposed in the wall 16 of an enclosure separating regions which may differ in pressure. A preselected higher pressure on the upper side of the valve, as shown in FIGS. 1 and 2, will exert an actuating force on the spring disc 24 tending to unseat the disc against the force of the spring bias of the disc to operate the spring disc valve element directly from a normally closed position, shown in FIG. 1, to an opened position shown in FIG. 2 for maximum and instantaneous fluid flow through the valve opening. The spring disc has two stable positions at opposite ends of its travel, the normally closed position which is between the stable positions and the opened position, hence after the disc has been operated by the fluid pressures exerted on the valve, it will remain open until manually reset by the reset tool which applies a negative force to the disc upon engaging the back side of the disc through apertures 36.

Referring to FIG. 4, a more detailed discussion of the valve operation can be made by an analysis of the actuating force and deflection characteristic curve of a typical spring disc having certain desirable characteristics utilized in the preferred embodiment of the invention. The force and deflection characteristic curve of FIG. 4 is representative of spring discs having a height and a thickness which when subjected to actuating forces indicated on the vertical scale of the graph will produce a deflection which is indicated on the horizontal scale of the graph.

In analyzing the characteristic curve, it is found that an increasing actuating force will deflect the spring non-linearly to its peak whereupon a decreasing actuating force will be sufficient to continue to deflect the spring until it snaps through its center position 40, indicated on the curve at approximately zero actuating force. Once the spring disc passes through center, it travels to the other stable position at the opposite end of travel which is the open position. In order to return the spring disc to its normally closed position, a negative force is required until the disc again passes through center position on its return travel. The spring will continue without applying any additional return force until it reaches a point 42 of zero deflection and force unless otherwise stopped in its travel by the valve seat. Normally the valve seat is located to be engaged by the edge of the disc prior to reaching the stable position 42 so that the force of the spring bias in the selected closed position will seat the disc to provide a fluid tight seal about the annular edge portion of the disc.

The spring disc is adjusted mechanically, in the preferred arrangement, by threading the removable section of the valve in the valve port member. The body portion is adjusted in a direction parallel to the center line of the valve seat or opening, until the spring is deflected to an operating point 46 indicated on the characteristic curve, a point at which the desired pressure differential across the valve in the proper direction will produce an actuating force on the valve element which will cause the valve element to operate opening the valve for the passage of fluid through the valve port opening. In order to maintain a fluid tight seal prior to valve operation, the sealing element 20 must have sufficient resiliency to expand over the range of deflection indicated between points 46 and 40 on the characteristic curve in FIG. 4. If the valve seat is not maintained fluid tight, the enclosure would not be able to efficiently provide fluid pressures below the pressure operating the valve and would in most instances, be otherwise not suitable for use.

Adjustment of the valve assembly for operation at desired pressure differentials has been provided by the support means for the spring disc where the annular threaded portion 28 co-operating with internal threads of the port member provides for a gradual movement of the support member along a center line normal to the valve port. In the assembly of the valve, the removable section, shown in FIG. 3, is inserted into the valve port member and threaded therein to adjust the section into a position where the outer annular edge portions of the spring disc engage the annular inner edge of the valve seat and the sealing member 20 as shown in FIG. 1. In the closed position, the spring disc engages the inner annular edge of the valve seat, rather than the sealing element alone to prevent undesired changes in deflection which could be caused by, for example, a reduction in cross-section of the sealing elements due to aging, etc. The removable section is mechanically adjusted until the spring disc is deflected to the magnitude indicated on the horizontal scale at 48 which is the deflection corresponding to the operating point 46 on the characteristic curve. After initial engagement of the typical spring disc and the valve seat, the mechanical adjustment produces an actuating force on the disc which follows the spring disc characteristic curve wherein the required actuating force increases to a maximum at the positive peak of the curve and then decreases as the valve section is moved into the position shown in FIG. 1, deflecting the spring disc from the end of its travel to the position shown.

After adjustment of the valve assembly, the pressure differential across the valve requires an actuating force on the upper surface of the spring disc, in the position as shown in FIG. 1, which will produce an actuating force 49 indicated on the vertical scale directly opposite the operating point 46. The typical spring disc, whose actuating force and deflection characteristic curve is shown in FIG. 4, requires an actuating force slightly over six pounds to operate the valve at a selected operating point 46. The deflection of the spring disc during mechanical adjustment from point 42 to point 46 is approximately .032 in. and the deflection of the spring disc during operation from point 46 to point 44 is about .032 in.

In summary, a pressure relief valve assembly has been provided which opens completely at a desired pressure to provide for maximum fluid flow through the valve port. A pressure sensitive movable valve element is selected to have a height and thickness providing for stability in normally closed and opened positions where an increasing and then a decreasing actuating force is required with deflection of the disc to its center position from either the normally closed position or the opened position. The removable section of the valve assembly includes a body support means and a valve disc. The disc and support means are adjustable in the valve port member to span the opening therein and engage the valve seat. Adjustment of the body member in the valve port deflects the disc, exerting an actuating force on the spring disc which follows the characteristic curve indicated in FIG. 4. When the spring disc has been deflected to the desired operating point on the curve where the actuating force corresponds to the desired operating pressure differential, the valve assembly is set for operation wherein a fluid pressure exerting a preselected actuating force which will operate the spring disc for instantaneous and maximum fluid flow through the valve. The valve will remain open until reset manually by a reset tool engaging the back side of the disc to produce a return force indicated on the negative portion of the actuating force and deflection characteristic curve shown in the graph in FIG. 4. As indicated by the curve, a negative actuating force of approximately six pounds is required to return the disc spring to its normally closed position at the operating point 46. For the best response to a preselected pressure differential, the valve should be adjusted to place the operating point 46 on the side of the curve indicated in the graph of FIG. 4. However, the operating point may be located near the peak of the curve and the portion of the curve adjacent the peak and still produce good operation.

It is evident from the foregoing description that the preferred embodiment may be modified to provide deflection of the inner annular edge of the spring disc in the operation of the valve instead of the outer annular edge by removal of retaining pin 30 and supporting and retaining the outer annular edge of the disc by the inwardly projecting flange 22. The modified valve, in this instance, would be operated by actuating forces produced by higher pressures below the disc as shown in FIGS. 1 and 2, and flow of fluid upon opening the valve would be through the central opening of the spring disc. It is also apparent that either the port member or the support member can be arranged to be the removable section while the other may be formed in the wall of the enclosure.

In the light of the above teachings, various other modifications and variations of the present invention are contemplated and are apparent to those skilled in the art without departing from the spirit and the scope of the invention.

I claim:
1. A pressure relief valve for limiting pressure differentials across a wall of an enclosure comprising in combination: an annular valve port member having an annular valve seat including a sealing element fitted in an annular channel in said seat and a substantially circular opening for the passage of fluid, and a valve operable at desired pressure differentials, said valve comprising; a disc which is slightly dished to frusto-conical shape and formed from spring metal and which has a central opening therethrough, an annular support means having a body portion secured to said valve port member for mounting the spring disc in a position spanning said circular opening and adjustably biased against said sealing element to provide an annular fluid-tight seal between the valve seat and the outer annular edge portion of the disc, said support means including means for retaining the annular inner edge portions of the disc to produce a fluid-tight seal while providing for relative movement of the inner edge portion of the disc during deflection thereof, said retaining means including an annular sealing element seated in an annular channel in said support means opposite said annular inner edge portion of the disc to maintain a fluid-tight seal about the annular inner edge of the disc; said frusto-conical disc having a height and thickness providing stable open and closed positions of the valve whereby a negative loading is required to reset the disc from an open position to a normally closed position and a loading and deflection characteristic whereby the load can be varied over the desired range of pressure differentials while the deflection of the disc is maintained within the range of expansion of the sealing elements to maintain the fluid-tight seals about the inner and outer edge portions of the disc when in normally closed position, and an aperture in the annular support means providing access to the disc for negative loading to reset the disc to its normally closed position.

2. A pressure relief valve for limiting the pressure differential across a wall of an enclosure comprising in combination: an annular valve port member having an annular valve seat including a sealing element fitted in an annular channel in said seat and a valve operable at desired pressure differential, said valve comprising a frusto-conical disc formed from spring metal and having a central opening therethrough, an annular support means having a body portion secured to said valve port member for maintaining the spring disc in the port opening and adjustably urged against said sealing element to provide an annular fluid-tight seal between the valve seat and the outer annular edge portion of the disc, said support means including a retaining pin having a head portion and a shaft portion, said shaft portion being passed through the disc opening and frictionally secured to a wall surrounding a central bore in the body portion of said support means to retain the inner edge portion of the disc between opposing faces of the head portion and a shoulder surrounding the bore, said faces being formed to provide annular channels having space for relative movement of the inner edge portion of the disc during deflection thereof, and an annular sealing element seated in a channel to maintain a fluid-tight seal about the annular inner edge of the disc, said frusto-conical disc having a height and thickness providing stable open and closed positions of the valve whereby a negative loading is required to reset the disc to its normally closed position and a deflection and actuating force characteristic curve whereby the actuation can be varied over the desired range of pressure differentials while the deflection of the disc is maintained within the range of expansion of the sealing elements to retain fluid-tight seals about the inner and outer edge portions of the disc over the range of deflection of the disc when the valve is in normally closed position, and an aperture in the annular support means providing access to the disc for negative loading to reset the disc to its normally closed position.

3. A pressure relief valve assembly comprising: a valve port member having an annular valve seat and a valve including a spring metal disc which is formed slightly dished and having a central opening, annular support means secured to said annular valve port member to maintain said disc seated in the valve seat when the valve is in normally closed position, said disc being retained by the support means about the inner annular edge portions about the central opening closing the central opening in the disc to the passage of fluids therethrough, said support means including means for adjusting the position of the disc in the valve port opening, said disc having a height and thickness providing for stable closed and opened positions and an increasing and decreasing actuating force with deflection of the disc to its approximate center from either the normally closed position or the open position wherein the support means is adjusted to position the disc in the valve port opening to engage the valve seat deflecting the disc while in closed position into the region of the actuating force and deflection characteristic curve where a decreasing actuating force is required to operate the valve to open position and the exact point is predetermined by the magnitude of the actuating force produced by the fluid pressure selected for operating the valve.

4. A pressure relief valve comprising: a valve port member having an annular valve seat inluding a resilient annular sealing element and a valve including a disc spring which is substantially frusto-conical in shape and formed from spring metal and which has a central opening therethrough, annular support means secured to said annular valve port member to maintain said disc seated in the valve seat when the valve is in normally closed position, said disc being retained by the support means about the inner annular edge portions about the opening in the disc wherein resilient sealing means adjacent the disc provide for movement of the inner edge portions and seal the opening in the disc to the passage of fluids therethrough, said support means including means for adjusting the position of the disc in the valve port opening, said disc having a height and thickness providing for stable closed and opened positions and an increasing and decreasing actuating force characteristic with deflection of the disc to its approximate center from either the normally closed position or the open position wherein the support means is adjusted to position the disc in the valve port opening and the valve seat to engage the valve seat deflecting the disc while in closed position into the region of the actuating force and deflection characteristic curve where a decreasing actuating force is required to operate the valve to open position and the exact point is predetermined by the magnitude of the actuating force produced by the fluid pressure selected for operating the valve.

5. A valve for substantially instantaneous operation to relieve a pressure difference thereacross which comprises: means defining a circular valve port providing communication between a region of relatively high pressure and an adjoining region of relatively low pressure; a pressure responsive valve element spanning said port, said element comprising a centrally pierced disc having inner and outer concentric edges, said disc being dished to frusto-conical shape for over-the-center spring action between two stable states distinguished by reversal of the axial positions of said inner and outer edges relative to each other; means supporting one of said edges concentrically of said port and in fixed axial relation therewith, said means including a resilient seal annularly engaging said one edge to permit angular deflection thereof in accordance with said over-the-center action; means defining a circular valve seat concentric with said port for fluid-tight engagement with the other of said edges when said element is in one of said stable states and for disengagement from said edge to provide an annular flow passage thereadjacent when said element is in the other of said stable states, said seat including a resilient seal for cooperation with said edge to maintain fluid-tight engagement therewith throughout a limited range of relative movement; and adjustment means operable to vary the axial relation between said seat and said supporting means for imparting a desired preload to said valve element.

6. A valve for substantially instantaneous operation to relieve a pressure difference thereacross which comprises: means defining a circular valve port providing communication between a region of relatively high pressure and an adjoining region of relatively low pressure, said port having a valve seat including an annular sealing member of resilient material on the low pressure side thereof; a pressure responsive valve element spanning the low pressure side of said port for cooperation with said seat, said element comprising a pierced disc having inner and outer concentric edges, said disc being dished to frusto-conical shape for over-the-center spring action between two stable states distinguished by reversal of the axial positions of said inner and outer edges relative to each other; means supporting said inner edge concentrically of said port and in fixed axial relation therewith, said means including a resilient seal annularly engaging said inner edge to permit angular deflection thereof in accordance with said over-the-center action and to prevent fluid flow therepast; and adjustment means operable to vary the axial relation between said support means and said port for urging said outer edge into engagement with said seat when said element is in one of said stable states and for imparting a desired preload thereto in the direction of said other stable state.

7. A valve for substantially instantaneous operation to relieve a pressure difference thereacross which comprises: means defining a circular valve port providing communication between a region of relatively high pressure and an adjoining region of relatively low pressure, the low pressure side of said port defining a valve seat including an annular seal of resilient material; a pressure responsive valve element spanning the low pressure side of said port for cooperation with said seat, said element comprising a pierced disc having inner and outer concentric edges, said disc being dished to frusto-conical shape for over-the-center spring action between opposite stable states distinguished by reversal of the axial positions of said inner and outer edges relative to each other; means supporting said inner edge concentrically of said port, said means including a resilient seal annularly engaging said inner edge to permit angular deflection thereof and to prevent fluid flow therepast; and thread means operatively connecting said support means and said port defining means for adjustment of the axial relation therebetween, whereby the outer edge of said valve element may be brought to bear upon said seat when said element is one of said stable states and a desired degree of deflection toward the other of said stable states may be imparted thereto.

References Cited in the file of this patent

UNITED STATES PATENTS

| | | |
|---|---|---|
| 502,750 | O'Neil | Aug. 8, 1893 |
| 1,681,911 | Spencer | Aug. 21, 1928 |
| 1,897,155 | Vaughn | Feb. 14, 1933 |
| 2,232,899 | Aikman | Feb. 25, 1941 |
| 2,506,751 | Trask | May 9, 1950 |
| 2,585,863 | Smith | Feb. 12, 1952 |
| 2,704,548 | Ralston | Mar. 22, 1955 |
| 2,777,303 | Slattery | Jan. 15, 1957 |

FOREIGN PATENTS

| | | |
|---|---|---|
| 58,178 | Germany | of 1891 |